(12) United States Patent
Kohno et al.

(10) Patent No.: US 8,737,465 B2
(45) Date of Patent: May 27, 2014

(54) VIDEO PROCESSING DEVICE, VIDEO PROCESSING METHOD, VIDEO PROCESSING PROGRAM, AND STORAGE MEDIUM

(75) Inventors: Yoshinori Kohno, Osaka (JP); Ryohsuke Niizuma, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/808,042

(22) PCT Filed: Jul. 19, 2011

(86) PCT No.: PCT/JP2011/066317
§ 371 (c)(1),
(2), (4) Date: Jan. 2, 2013

(87) PCT Pub. No.: WO2012/008602
PCT Pub. Date: Jan. 19, 2012

(65) Prior Publication Data
US 2013/0107946 A1      May 2, 2013

(30) Foreign Application Priority Data

Jul. 16, 2010  (JP) ................................ 2010-162142

(51) Int. Cl.
*H04N 7/12* (2006.01)
*G06K 9/40* (2006.01)
*H04N 7/26* (2006.01)
*H04N 5/213* (2006.01)

(52) U.S. Cl.
CPC ... *H04N 19/00096* (2013.01); *H04N 19/00909* (2013.01); *H04N 19/0089* (2013.01); *H04N 19/00212* (2013.01); *H04N 19/00278* (2013.01); *H04N 19/00066* (2013.01); *H04N 5/213* (2013.01); *H04N 19/00369* (2013.01)
USPC ...................................... 375/240.03; 382/251

(58) Field of Classification Search
USPC ............. 382/251, 255, 266, 268; 375/240.03, 375/240.12, 240.27, 240.29; 358/463
See application file for complete search history.

(56) References Cited

U.S. PATENT DOCUMENTS 5,610,729 A * 3/1997 Nakajima ..................... 358/463
5,748,795 A   5/1998 Ohnishi et al.
(Continued)

FOREIGN PATENT DOCUMENTS

JP    8-214309 A    8/1996
JP   10-229546 A    8/1998
(Continued)

OTHER PUBLICATIONS

Office Action issued in connection with JP Application No. 2010-162142, which is a basic application of PCT/JP2011/066317, issued on Oct. 18, 2003.

*Primary Examiner* — Gims Philippe
(74) *Attorney, Agent, or Firm* — Birch, Stewart, Kolasch & Birch, LLP (57) ABSTRACT

Provided is a video processing technique capable of carrying out noise reduction processing and image quality correction using a configuration that is typically used in decoding processing. A video processing device according to the present invention counts the number of blocks in which a quantization parameter in video exceeds a predetermined threshold value and calculates a noise amount in the video based on the count result. Further, an amount by which the noise is to be reduced is adjusted in accordance with the calculated noise amount.

20 Claims, 5 Drawing Sheets

(56) References Cited

U.S. PATENT DOCUMENTS

| | | | |
|---|---|---|---|
| 6,041,145 A * | 3/2000 | Hayashi et al. | 382/268 |
| 6,175,596 B1 | 1/2001 | Kobayashi et al. | |
| 7,711,199 B2 * | 5/2010 | Lee et al. | 382/251 |
| 8,295,633 B2 * | 10/2012 | Sangkeun et al. | 382/268 |
| 8,331,447 B2 * | 12/2012 | Nakagawa | 375/240.12 |
| 2007/0250893 A1 | 10/2007 | Akiyama et al. | |
| 2008/0199090 A1 | 8/2008 | Tasaka et al. | |
| 2008/0310516 A1 | 12/2008 | Kobayashi et al. | |

FOREIGN PATENT DOCUMENTS

| | | |
|---|---|---|
| JP | 2003-18600 A | 1/2003 |
| JP | 2003-179921 A | 6/2003 |
| JP | 2006-32999 A | 2/2006 |
| JP | 2007-28489 A | 2/2007 |
| JP | 2007-281542 A | 10/2007 |
| JP | 2007-336468 A | 12/2007 |
| JP | 2008-205534 A | 9/2008 |
| JP | 2008-311951 A | 12/2008 |
| JP | 2009-33317 A | 2/2009 |
| JP | 2009-296124 A | 12/2009 |

* cited by examiner

VIDEO PROCESSING DEVICE, VIDEO PROCESSING METHOD, VIDEO PROCESSING PROGRAM, AND STORAGE MEDIUM

TECHNICAL FIELD

The present invention relates to a technique for processing noise in video.

BACKGROUND ART

Conventionally, techniques for reducing noise generated in a process of decoding compression-coded video have been developed.

Patent Literature 1 listed below describes a technique in which a weighting factor is set based on a distance from a coding block boundary of block coding and an image quality correction amount at the time of correcting image quality is controlled in accordance with this weighting factor.

CITATION LIST

Patent Literature

Patent Literature 1: JP Patent Publication (Kokai) No. H10-229546A (1998)

SUMMARY OF INVENTION

Technical Problem

The technique described in the stated Patent Literature 1 is based on an assumption that the distance from the coding block boundary of the block coding is obtained. Thus, this method cannot be employed in a device in which such a distance cannot be obtained, and noise reduction processing and image quality correction processing cannot be carried out.

The present invention has been made to solve the problem stated above, and it is an object to provide a video processing technique in which noise reduction processing and image quality correction can be carried out using a configuration that is typically used in decoding processing.

Solution to Problem

A video processing device according to the present invention counts the number of blocks in which a quantization parameter of video exceeds a predetermined threshold value and calculates a noise amount in the video based on the count result. Further, an amount by which the noise is to be reduced is adjusted in accordance with the calculated noise amount.

Advantageous Effects of Invention

With a video processing device according to the present invention, since a noise amount is calculated based on whether or not a quantization parameter exceeds a predetermined threshold value, noise reduction processing and image quality correction can be carried out as long as the quantization parameter can be obtained. Since quantization processing is employed in many image coding systems such as MPEG2, the noise reduction processing and the image quality correction can be carried out in many cases. That is, the present invention is advantageous in that a special system does not need to be employed to calculate a noise amount.

DESCRIPTION OF EMBODIMENTS

<Embodiment 1>

Figure 1:
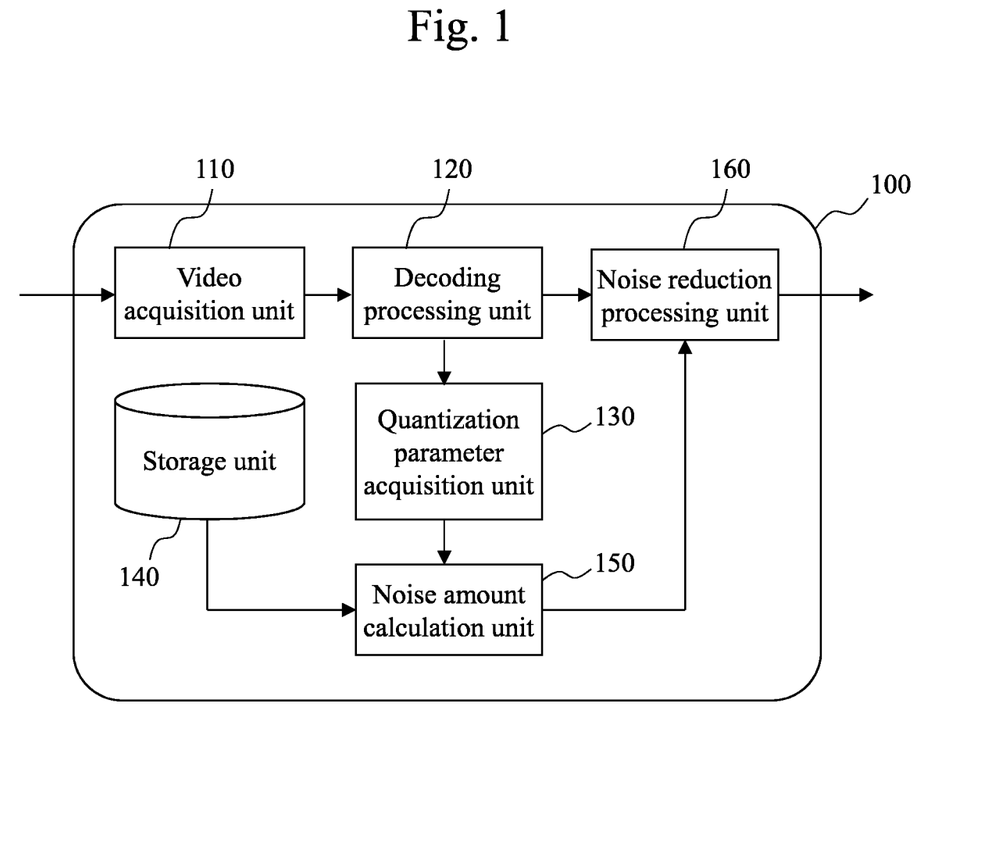
FIG. 1 is a functional block diagram of a video processing device 100 according to an embodiment 1.

FIG. 1 is a functional block diagram of a video processing device 100 according to an embodiment 1 of the present invention. The video processing device 100 is a device for correcting noise in an inputted video signal and includes a video acquisition unit 110, a decoding processing unit 120, a quantization parameter acquisition unit 130, a storage unit 140, a noise amount calculation unit 150, and a noise reduction processing unit 160.

The video acquisition unit 110 receives a video signal obtained by converting video into a signal. A source from which the video signal is acquired can be in any form of video signal source such as a broadcast wave, and video data stored in a storage medium. Here, it is necessary that the video signal employs a method through which a quantization parameter to be described below can be acquired.

The decoding processing unit 120 decodes the video signal that the video acquisition unit 110 has acquired. Since the video signal is typically coded through some sort of method, the signal needs to be processed by the decoding processing unit 120.

The quantization parameter acquisition unit 130 acquires a quantization parameter to be used in a process through which the decoding processing unit 120 decodes the video signal. In many image coding methods, quantization processing is carried out when video is coded. Since the quantization parameter at this time will be required to carry out the decoding processing, the quantization parameter is handed over to an entity that carries out the decoding processing in a mode of some sort. For example, the quantization parameter per video block can be written in a header portion of a video stream. The quantization parameter acquisition unit 130 acquires this quantization parameter in accordance with a system that is employed in the coding method.

Note that in a case where the video is not coded, the quantization parameter cannot be acquired, in which case, however, the method according to the present invention does not need to be employed, since noise associated with the coding is not generated without the coding processing.

The storage unit 140 stores a threshold value for calculating a noise amount in the video using the quantization parameter. This threshold value is used to determine whether or not a high frequency component is largely removed in a video block in which the quantization parameter is applied based on how large or small the value of the quantization parameter is.

The noise amount calculation unit 150 calculates a noise amount in the video using the quantization parameter that the quantization parameter acquisition unit 130 has acquired and the threshold value stored in the storage unit 140. The calculation method will be described later.

The noise reduction processing unit 160 carries out processing to reduce the noise in the video based on the noise amount that the noise amount calculation unit 150 has calculated. In particular, processing to remove a high frequency component in an image, processing to reduce noise generated at a boundary in an image, and the like, for example, correspond to such processing.

The video acquisition unit 110, the decoding processing unit 120, the quantization parameter acquisition unit 130, the noise amount calculation unit 150, and the noise reduction processing unit 160 can be realized using hardware such as a circuit device for realizing these functions or can be configured by using an arithmetic device such as a microcomputer or a central processing unit (CPU) and software for defining the operation of the arithmetic device.

The storage unit 140 can, for example, be configured by using a storage device such as a hard disk drive (HDD).

Thus far, the configuration of the video processing device 100 according to the embodiment 1 has been described. Subsequently, processing through which the video processing device 100 calculates the noise amount will be described in conjunction with a basic idea.

<Embodiment 1: Idea for Noise Amount Calculation>

Typically, quantization processing is carried out when a video signal is coded. This processing primarily aims to compress an information amount by thinning down a high frequency component in the video signal. For example, an amplitude value of each frequency component is divided by a quantization parameter to reduce the scale of the amplitude value. Through this, the number of bits required to express the amplitude value of each frequency component is reduced, and such processing where a minute amplitude value is approximated to 0 for simplification can be carried out. As a result, an information amount required to express the video can be reduced.

When a video signal is coded, video is divided into a plurality of regions (blocks), and coding processing and quantization processing are carried out on each block in some cases. In this case, a different quantization parameter can be employed for each block. A value of a quantization parameter in a given block being large means that more high frequency components have been thinned down through the coding process. That is, it is contemplated that when a block where the value of the quantization parameter is large is decoded, since more high frequency components are lost therein, noise is easily generated in the decoded video.

The present invention focuses on this point, and a volume of a noise amount after decoding in the block is estimated from the size of the value of the quantization parameter. In a coding system in which the quantization processing is carried out when the coding processing is carried out, the decoding side should always be able to acquire the quantization parameter as well. Thus, in the coding system in which the quantization is employed, the noise amount can advantageously be calculated reliably by calculating the noise amount using the quantization parameter without employing a special coding system or a special calculation method.

After the noise amount is calculated, correction processing (noise reduction processing) that is appropriate for that noise amount is carried out on the video, whereby such optimal correction processing can be carried out where a correction amount is reduced for a block where the noise is small or a correction amount is increased for a block where the noise is large.

<Embodiment 1: Noise Reduction Procedure>

Hereinafter, a procedure through which the video processing device 100 calculates a noise amount and carries out noise reduction processing using that noise amount will be described.

(Step 1: Acquire Video Signal)

The video acquisition unit 110 acquires a video signal from a given video signal source.

(Step 2: Acquire Quantization Parameter)

The decoding processing unit 120 decodes the video signal that the video acquisition unit 110 has acquired. The quantization parameter acquisition unit 130 acquires a quantization parameter to be obtained in a process through which the video signal is decoded. In a case where a quantization parameter is set for each block in the video, the quantization parameter for each block is acquired.

(Step 2: Acquire Quantization Parameter: Supplementation)

A method by which the quantization parameter acquisition unit 130 acquires the quantization parameter may differ depending on the coding method. For example, as stated above, in a case where a quantization parameter is recorded in the video signal itself, that value may be acquired. Although it is not necessary to induce a quantization parameter from the video signal itself, since the value of the quantization parameter will be required when the decoding processing is carried out regardless of the employed coding method, that value may be acquired.

(Step 3: Acquire Threshold Value)

The noise amount calculation unit 150 acquires the quantization parameter that the quantization parameter acquisition unit 130 has acquired. Further, the noise amount calculation unit 150 acquires from the storage unit 140 a threshold value for calculating the noise amount in the video based on the quantization parameter.

(Step 4: Calculate Noise Amount)

The noise amount calculation unit 150 counts the number of blocks in which the value of the quantization parameter exceeds the stated threshold value among video blocks in the video. The noise amount calculation unit 150 calculates the noise amount in the video using the count result.

(Step 4: Calculate Noise Amount: Supplementation 1)

The number of blocks in which the value of the quantization parameter exceeds the threshold value being large means that the number of blocks in which a high frequency component is largely removed is large. Since it is considered that when a block in which a high frequency component is largely removed is decoded, a difference before and after the coding becomes large, and that block is so treated that the noise after the decoding is large. It is considered that the noise amount in the entire video is larger in a block where the noise is larger; thus, the noise amount is defined using the number of blocks in which the quantization parameter exceeds the threshold value.

(Step 4: Calculate Noise Amount: Supplementation 2)

The number itself of blocks in which the quantization parameter exceeds the threshold value may be regarded as the noise amount, or the noise amount may be newly calculated by applying some arithmetic expression on the stated number. In either case, what is common is that the noise amount in the video is calculated based on the number of blocks in which the quantization parameter exceeds the threshold value. This point is the same in the embodiments below.

(Step 5: Noise Reduction Processing)

The noise reduction processing unit 160 carries out noise reduction processing upon adjusting the amount by which the noise in the video is to be reduced in accordance with the noise amount that the noise amount calculation unit 150 has calculated. In particular, if the noise amount in the video is large, intensity of the noise reduction processing is raised. For example, a reduction amount (filter gain) of a high frequency component to be removed through a high frequency filter is increased.

(Step 5: Noise Reduction Processing: Supplementation 1)

Since the quantization processing is processing for removing a high frequency component in the coding process, increasing the amount of a high frequency component to be removed in this step may seem as if a high frequency component is doubly removed. However, when video in which a high frequency component has been removed in the coding process is decoded, more high frequency noise is generated in some cases since the original high frequency component has been lost in the coding process. A typical example of such includes block noise in which an image looks as if the image is divided in a grid-like manner at block boundaries. Thus, this step is considered to be necessary in order to effectively remove the noise generated after decoding.

(Step 5: Noise Reduction Processing: Supplementation 2)

As a reference for calculating the noise amount after decoding, the quantization parameter is used in the embodiment 1. As reasons for the above, in addition to the fact that the quantization parameter can always be acquired at the decoding side, the fact that the quantization parameter indicates a degree of information compression is also taken into account. That is, the value of the quantization parameter being large means that the more high frequency component has been removed, and thus it is considered that more noise is generated after decoding. Accordingly, estimating the noise amount based on the size of the quantization parameter is considered to be valid. The present invention is considered to be advantageous in that these dual advantages can be effectively obtained.

<Embodiment 1: Summary>

As described thus far, the video processing device 100 according to the embodiment 1 calculates the noise amount in the video using the number of blocks in which the value of the quantization parameter exceeds the threshold value. In a case where the quantization processing is carried out in the process of video coding, it is considered that the quantization parameter can also be acquired at the decoding side; therefore, special information does not need to be used or a unique calculation method does not need to be employed to calculate the noise amount, and the noise amount can be reliably calculated.

Further, in the embodiment 1, the noise amount is calculated using the number of blocks in which the value of the quantization parameter exceeds the threshold value, based on the idea that more noise is generated when a block in which the more high frequency component has been removed in the coding process is decoded. Through this, since the noise amount can be calculated corresponding to the process of coding processing, a noise amount appropriate for the image characteristics can be obtained.

Further, in the embodiment 1, an amount by which the noise is to be reduced is adjusted in accordance with the calculated noise amount. Accordingly, such a disadvantage that the amount by which the noise is to be reduced for video with small noise is increased to rather increase the noise can be avoided, and appropriate noise reduction processing can be carried out.

<Embodiment 2>

In the embodiment 1, the noise amount is calculated based on whether or not the quantization parameter exceeds the threshold value. In an embodiment 2 of the present invention, values of the quantization parameters are divided into a plurality of levels based on the size of the values, and the total is counted after multiplying each quantization parameter by a weighting factor assigned to each level. Through this, the degree of noise in the video is analyzed in more detail, and the noise amount after decoding will be calculated more appropriately. Since the configuration of the video processing device 100 is the same as that in the embodiment 1, the description to follow will center on the difference pertaining to the stated calculation method.

Figure 2:
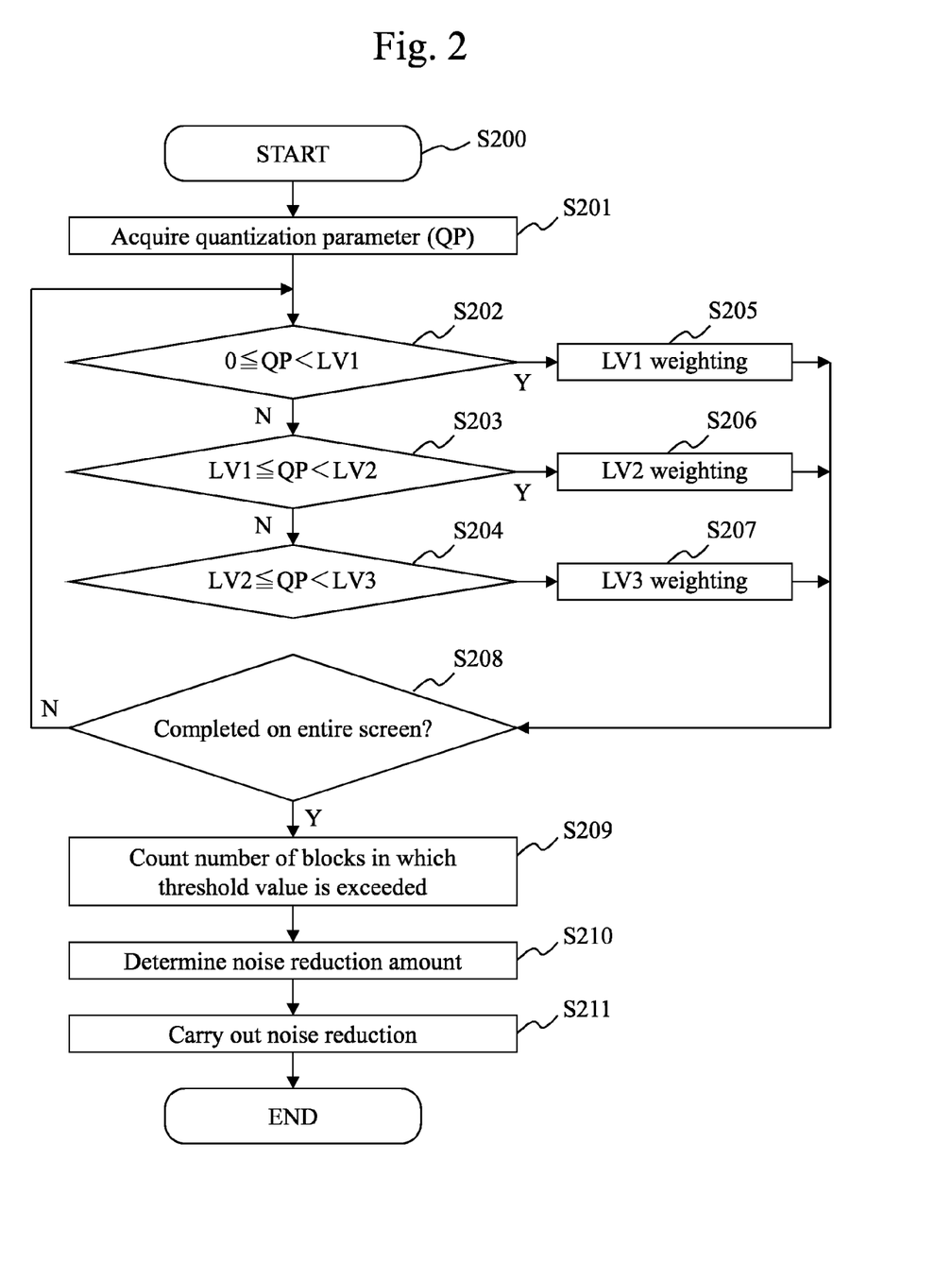
FIG. 2 shows an operation flow of the video processing device 100 according to an embodiment 2.

FIG. 2 shows an operation flow of the video processing device 100 according to the embodiment 2. Hereinafter, each step in FIG. 2 will be described.

(FIG. 2: Step S200)

This operation flow starts when the video acquisition unit 110 acquires a video signal. The decoding processing unit 120 decodes the video signal that the video acquisition unit 110 has acquired.

(FIG. 2: Step S201)

The quantization parameter acquisition unit 130 acquires a quantization parameter of each video block obtained through a process in decoding processing as described in the embodiment 1.

(FIG. 2: Steps S202 to S204)

The noise amount calculation unit 150 classifies the value of the quantization parameter of each video block that the quantization parameter acquisition unit 130 has acquired into one of the plurality of levels depending on the size of the value. Here, although an example of classifying into three levels is illustrated, the present invention is not limited thereto. The noise amount calculation unit 150 determines to which of the three levels the value of the quantization parameter belongs.

(FIG. 2: Steps S205 to S207)

The noise amount calculation unit 150 multiplies the quantization parameter by a weighting factor determined in advance in accordance with the level to which the value of the quantization parameter belongs. While the raw value of the quantization parameter is used in the embodiment 1, a value obtained by being multiplied by a weighting factor is used in the embodiment 2. Thus, by adjusting the weighting factor or the like, a process of calculating the noise amount can be adjusted in more detail.

(FIG. 2: Steps S205 to S207: Supplementation 1)

The weighting factors in this step do not need to be common to all blocks. For example, an adjustment can be made such that the weighting factor may be made small in general in each level for a block that is considered to be less important, and LV2-3 can be set higher than in other blocks for blocks that are considered to be more important.

(FIG. 2: Steps S205 to S207: Supplementation 2)

The values of the weighting factors may be stored in advance in a storage device such as the storage unit 140 and may be loaded as necessary.

(FIG. 2: Step S208)

The noise amount calculation unit 150 determines whether or not the above steps have been carried out on all blocks in a screen. If the steps have not been completed, the operation returns to Step S202 to repeat the same processing, and if the steps have been completed, the operation proceeds to Step S209.

(FIG. 2: Steps S209 to S211)

The noise amount calculation unit 150 counts the number of blocks in which the value of the quantization parameter exceeds the threshold value and calculates a noise amount in the video based on that result as in the embodiment 1. What differs from the embodiment 1 here is that, in the present embodiment, the value of the quantization parameter is compared with the threshold value after being multiplied by the weighting factor. The processing of the noise reduction processing unit 160 is the same as that in the embodiment 1.

<Embodiment 2 Summary>

As described above, according to the embodiment 2, the noise amount calculation unit 150 divides the quantization parameters into levels and assigns the weighting factor to each level. The noise amount calculation unit 150 counts the total of the results of multiplying the quantization parameters by the weighting factors to calculate the noise amount in the video. Through this, in addition to the threshold value stored in the storage unit 140, the weighting factor can be adjusted, and thus the process of calculating the noise amount can be adjusted in more detail.

For example, in addition to the above-described method in which the weighting factor is adjusted in accordance with the importance of each block, a method in which the weighting factor is adjusted in accordance with the type of the video or the like can be considered. Note that adjustment of the threshold value or the weighting factor may be carried out dynamically each time video is inputted, or a plurality of conceivable combination patterns may be prepared in advance and stored in the storage unit 140 and one of the combination patterns may be applied when video is inputted.

<Embodiment 3>

In the embodiments 1 and 2, the number of blocks in which the quantization parameter exceeds the threshold value is counted, and that value is employed as the noise amount in the video. As another modification, the number of blocks in which the quantization parameter exceeds the threshold value is counted, and a value obtained by dividing that value by the total number of blocks, that is, a ratio of blocks in which the quantization parameter is large to the total can be defined as the noise amount.

Further, even in the case where the quantization parameter is multiplied by the weighting factor as in the embodiment 2, a value obtained by dividing the count result obtained at the end by the total number of blocks, that is, a ratio of blocks in which the weighted quantization parameter is large to the total can be defined as the noise amount of the video.

<Embodiment 4>

Figure 3:
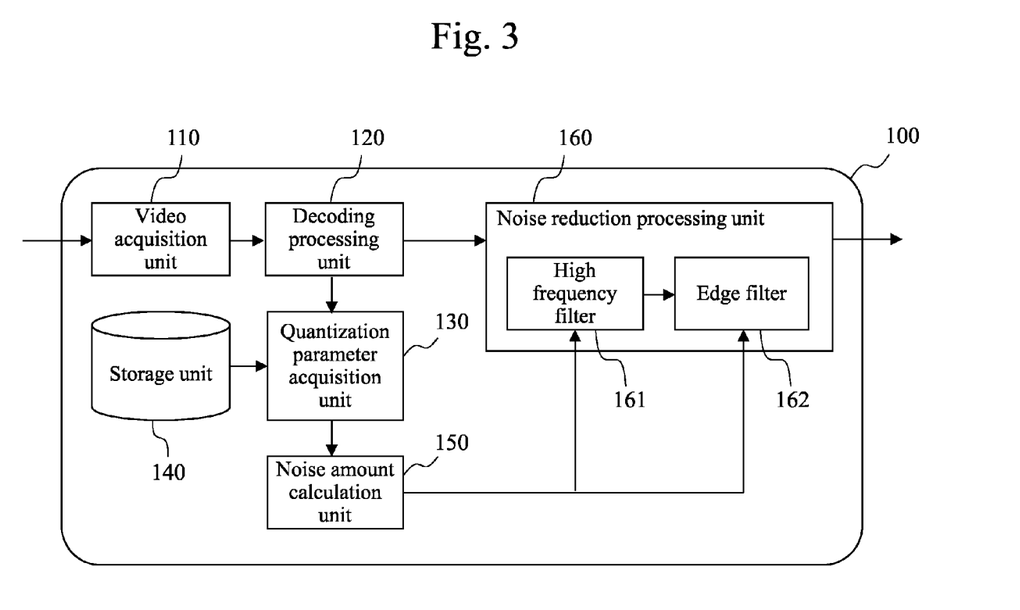
FIG. 3 is a functional block diagram of the video processing device 100 according to an embodiment 4.

FIG. 3 is a functional block diagram of the video processing device 100 according to an embodiment 4 of the present invention. The video processing device 100 of the embodiment 4 includes a high frequency filter 161 and an edge filter 162 as internal functionality of the noise reduction processing unit 160 in the configuration described in the embodiments 1 to 3. Other configurations are the same as those of the embodiments 1 to 3.

The high frequency filter 161 is a filter for removing a high frequency component in video signal that the decoding processing unit 130 has decoded. The high frequency filter 161 carries out processing to remove a high frequency component on the entire screen of the video signal that the decoding processing unit 130 has decoded. Note that the amount (filter gain) of the high frequency component to be removed is configured to be modifiable.

The edge filter 162 is a filter for removing noise (edge noise) generated at an outline portion of the video signal that the decoding processing unit 130 has decoded. For example, mosquito noise or the like generated at the edge portion of an image is removed. The edge filter 162 carries out processing to remove the edge noise on the entire screen of the video signal that the decoding processing unit 130 has decoded. Note that the amount (filter gain) of the high frequency component to be removed is configured to be modifiable.

In the embodiment 4, the noise amount calculation unit 150 adjusts the amount of noise reduced by the high frequency filter 161 and the amount of noise reduced by the edge filter 162 based on the calculated noise amount. In particular, the amount of noise reduced by each filter is increased as the noise amount in the video is larger to reduce the noise after decoding.

In the embodiment 4, since the noise is reduced by the noise filters, the filter gains may be adjusted to adjust the noise reduction amount. In a case where the noise is reduced through another method, the noise reduction amount is adjusted in accordance with the given method.

<Embodiment 4: Summary>

As described above, according to the embodiment 4, the noise amount calculation unit 150 adjusts the filter gain of each noise filter based on the calculated noise amount. Through this, the noise correction processing amount can be adjusted in accordance with the calculated noise amount.

<Embodiment 5>

Figure 4:
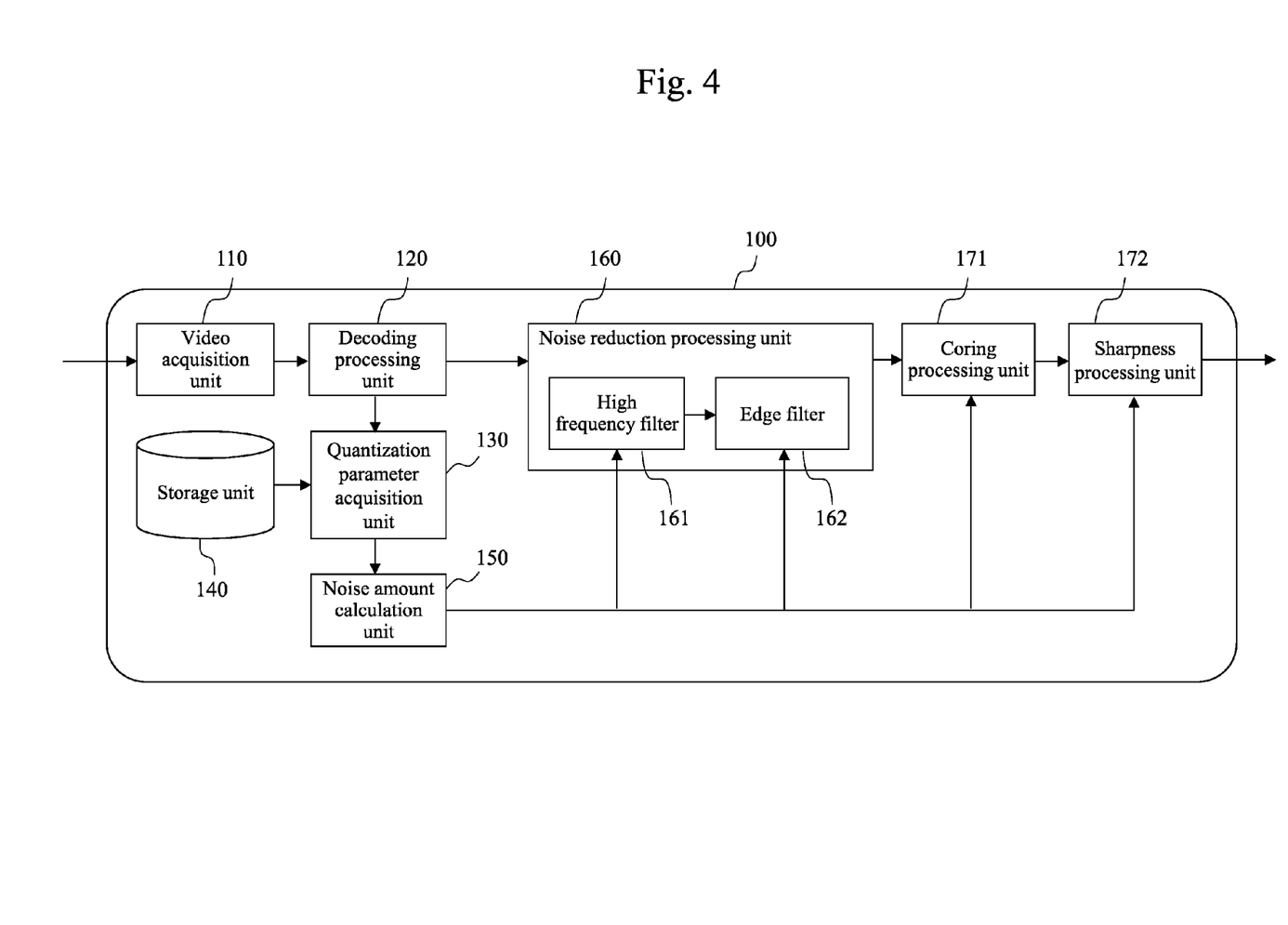
FIG. 4 is a functional block diagram of the video processing device 100 according to an embodiment 5.

FIG. 4 is a functional block diagram of the video processing device 100 according to an embodiment 5 of the present invention. The video processing device 100 of the embodiment 5 further includes a coring processing unit 171 and a sharpness processing unit 172 in addition to the configurations described in the embodiments 1 to 4. Other configurations are the same as those of the embodiments 1 to 4.

In FIG. 4, although an example where the coring processing unit 171 and the sharpness processing unit 172 are provided in addition to the configurations described in the embodiment 4 is illustrated, the coring processing unit 171 and the sharpness processing unit 172 may be provided in the configurations of other embodiments.

The coring processing unit 171 carries out processing to remove a minute high frequency component on the entire screen of the video on which the noise reduction processing unit 160 has carried out the noise reduction processing. This is for removing a high frequency component in advance so that the sharpness processing unit 172 to be subsequently described will not emphasize the high frequency noise. In particular, there is a possibility where block noise generated at a boundary portion of the video block cannot be removed sufficiently with the high frequency filter 161. By removing the block noise in advance with the coring processing unit 171, even if the sharpness processing unit 172 emphasizes the block noise, the influence thereof can be suppressed.

The sharpness processing unit 172 carries out outline emphasizing processing on the entire screen of the video on which the noise reduction processing unit 160 has carried out the noise reduction processing. The outline emphasizing processing has an effect of amplifying the high frequency component, and thus the outline emphasizing processing is carried out after the minute high frequency component is removed in advance with the coring processing unit 171.

<Embodiment 5: Summary>

As described above, according to the embodiment 5, the processing to reduce the high frequency noise is carried out in accordance with the calculation result of the noise amount calculation unit 150, and then the outline emphasizing processing is further carried out by the sharpness processing unit 172, whereby sharp video in which noise is removed can be obtained.

Further, according to the embodiment 5, by removing the minute high frequency noise such as the block noise with the coring processing unit 171, the effect of the outline emphasis can be manifested effectively while suppressing the negative influence by the sharpness processing unit 172.

<Embodiment 6>

In the embodiments 4 and 5, although the high frequency filter 161, the edge filter 162, the coring processing unit 171, and the sharpness processing unit 172 carry out the processing on the entire screen of the video, each of these units may be limited to carry out the processing only on blocks in a part of the screen. For example, the processing by each unit described above may be carried out only on blocks in which the value of the quantization parameter (or the value of the weighted quantization parameter) exceeds the threshold value.

Through this, the noise reduction processing can be carried out on the block in which the noise amount is large, and an image whose sharpness has decreased with the noise reduction processing can be newly sharpened. Further, the embodiment 6 is advantageous compared to the embodiments 4 and 5 in that a processing load can be suppressed by limiting the blocks on which the processing is to be carried out.

Note that carrying out the noise reduction processing or the sharpening processing only on specific blocks may lead to an imbalance between the specific blocks and blocks adjacent thereto. Therefore, the same noise reduction processing or sharpening processing may be carried out on the peripheral region including the blocks in which the noise amount is large, for example. Through this, a balance with the other blocks can be achieved while a processing load is suppressed.

<Embodiment 7>

Figure 5:
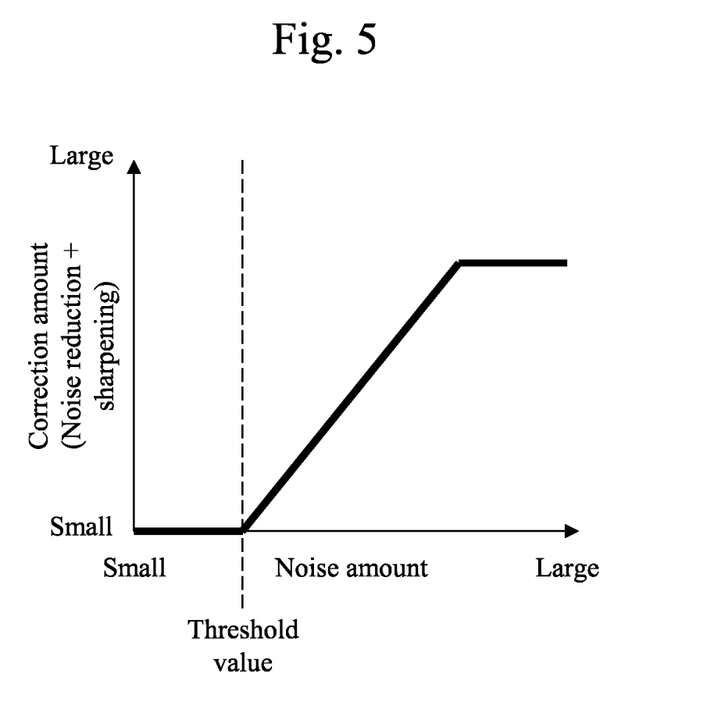
FIG. 5 is a diagram conceptually showing a relationship between a video correction amount carried out by the video processing device 100 and a noise amount in the video.

FIG. 5 is a diagram conceptually showing a relationship between a video correction amount carried out by the video processing device 100 according to the present invention and a noise amount in the video.

In the present invention, since the noise amount in the video is calculated based on the blocks in which the value of the quantization parameter exceeds the threshold value, unless the value of the quantization parameter exceeds the threshold value, the determination that there is noise is not made. That is, until the noise amount reaches the threshold value, the video correction amount does not increase and stays substantially constant.

After the noise amount exceeds the threshold value, the noise reduction amount in the noise reduction processing unit 160 is increased as the noise amount increases, and thus the relationship between the noise amount and the correction amount is proportional.

By adjusting the threshold value in FIG. 5 or the proportionality factor between the noise amount and the correction amount, the processing characteristics of the video processing device 100 can be adjusted. Further, by adjusting the weighting factor described in the embodiment 2 as well, the same effect can be achieved.

Besides, by adjusting the noise reduction amount of the noise reduction processing unit 160 or the processing amounts of the coring processing unit 171 and the sharpness processing unit 172, the characteristics in the vertical axis direction in FIG. 5 can be adjusted.

<Embodiment 8>

In the embodiments 1 to 7 described above, as an acquisition source from which the video acquisition unit 110 acquires a video signal, the following can be considered as examples.

(Example of video signal source 1) Acquiring a video signal from an analog video broadcast wave.

(Example of video signal source 2) Acquiring a video signal from a digital video broadcast wave.

(Example of video signal source 3) Acquiring a video signal recorded in a storage medium such as a Blu-ray (registered trademark) disk, Digital Versatile Disk (DVD) (registered trademark), and Hard Disk Drive (HDD).

(Example of video signal source 4) Acquiring a video signal from a broadcast wave such as an IP broadcast wave and a CATV broadcast wave.

(Example of video signal source 5) Acquiring a video signal from an external device such as an external video recording device and an external video acquisition device.

<Embodiment 9>

A program for realizing the processing of each functional unit of the video processing device 100 described in the above embodiments 1 to 8 may be recorded on a computer readable storage medium, and the program recorded on this storage medium may be loaded onto a computer system to be executed, whereby the processing of each functional unit may be realized. Note that the "computer system" herein may include an operating system (OS) or hardware such as peripheral equipment.

Further, the stated program may be for realizing a part of the above-described function, and the above-described function may be realized through a combination with the program that is already recorded on the computer system.

Further, the "storage medium" on which the program is stored refers to a computer readable portable medium such as a flexible disk, a magneto-optical disk, a read only memory (ROM), and a CD-ROM, or to a storage device such as a hard disk embedded in the computer system. Furthermore, an entity that dynamically holds a program for a short period of time as in a communication line in a case of transmitting the program through a network such as the internet or a communication line such as a telephone line, or an entity that holds a program for a certain period of time as in a volatile memory inside a computer system that serves as a server or a client in the above case may also be included.

Reference Signs List

100: video processing unit, 110: video acquisition unit, 120: decoding processing unit, 130: quantization parameter acquisition unit, 140: storage unit, 150: noise amount calculation unit, 160: noise reduction processing unit, 161: high frequency filter, 162: edge filter, 171: coring processing unit, 172: sharpness processing unit

The invention claimed is:

1. A video processing device, comprising:
a video acquisition unit configured to receive a video signal obtained by converting video into a signal;
a quantization parameter acquisition unit configured to acquire quantization parameter for each block in the video;
a storage unit configured to store a threshold value for calculating a noise amount in a decoded video obtained by decoding the video;
a noise amount calculation unit configured to calculate the noise amount in the video using the quantization parameter and the threshold value; and
a noise reduction processing unit configured to reduce the noise in accordance with the noise amount that the noise amount calculation unit has calculated,
wherein
the noise amount calculation unit is configured to calculate the noise amount in the video based on the number of the blocks in which value of the quantization parameter exceeds the threshold value, and
the noise reduction processing unit is configured to increase an amount by which the noise is to be reduced as the noise amount becomes larger.

2. The video processing device according to claim 1, wherein in a case that the noise amount calculation unit calculates the noise amount, the noise amount calculation unit:
divides values of quantization parameters in each block in the video into a plurality of levels,
assigns a different weighting factor to each of the levels, and
counts the number of the blocks in which a value obtained by multiplying a value of a quantization parameter in the block by the weighting factor assigned to the level to which the quantization parameter belongs and calculates the noise amount in the video using the count result.

3. The video processing device according to claim 2, wherein
the noise reduction processing unit:
includes a high frequency filter configured to remove a high frequency component in the video, and
adjusts an amount by which the high frequency filter removes the high frequency component in accordance with the noise amount.

4. The video processing device according to claim 2, wherein
the noise reduction processing unit:
includes an edge filter configured to remove noise at an outline portion of the video, and
adjusts an amount by which the edge filter removes noise at the outline portion in accordance with the noise amount.

5. The video processing device according to claim 1, wherein
in a case that the noise amount calculation unit calculates the noise amount, the noise amount calculation unit calculates the noise amount using a ratio of the number of the blocks in which the quantization parameter exceeds the threshold value to the total number of blocks in the video.

6. The video processing device according to claim 5, wherein
the noise reduction processing unit:
includes a high frequency filter configured to remove a high frequency component in the video, and
adjusts an amount by which the high frequency filter removes the high frequency component in accordance with the noise amount.

7. The video processing device according to claim 5, wherein
the noise reduction processing unit:
includes an edge filter configured to remove noise at an outline portion of the video, and
adjusts an amount by which the edge filter removes noise at the outline portion in accordance with the noise amount.

8. The video processing device according to claim 1, wherein
in a case that the noise amount calculation unit calculates the noise amount, the noise amount calculation unit:
divides quantization parameters in each block in the video into a plurality of levels,
assigns a different weighting factor to each of the levels, and
counts the number of the blocks in which a value obtained by multiplying a value of a quantization parameter in the block by the weighting factor assigned to the level to which the quantization parameter belongs and calculates the noise amount using a value obtained by dividing the count result by the total number of blocks in the video.

9. The video processing device according to claim 8, wherein
the noise reduction processing unit:
includes a high frequency filter configured to remove a high frequency component in the video, and
adjusts an amount by which the high frequency filter removes the high frequency component in accordance with the noise amount.

10. The video processing device according to claim 8, wherein
the noise reduction processing unit:
includes an edge filter configured to remove noise at an outline portion of the video, and
adjusts an amount by which the edge filter removes noise at the outline portion in accordance with the noise amount.

11. The video processing device according to claim 1, wherein
the noise reduction processing unit:
includes a high frequency filter configured to remove a high frequency component in the video, and
adjusts an amount by which the high frequency filter removes the high frequency component in accordance with the noise amount.

12. The video processing device according to claim 11, wherein
the noise reduction processing unit includes a sharpness processing unit configured to carry out outline emphasizing processing on an entire screen in the video.

13. The video processing device according to claim 11, wherein
the noise reduction processing unit includes a sharpness processing unit configured to carry out outline emphasizing processing on a block among blocks in the video in which the quantization parameter exceeds the threshold value.

14. The video processing device according to claim 11, wherein
the noise reduction processing unit:
includes an edge filter configured to remove noise at an outline portion of the video, and
adjusts an amount by which the edge filter removes noise at the outline portion in2 accordance with the noise amount.

15. The video processing device according to claim 1, wherein
the noise reduction processing unit:
includes an edge filter configured to remove noise at an outline portion of the video, and
adjusts an amount by which the edge filter removes noise at the outline portion in accordance with the noise amount.

16. The video processing device according to claim 1, wherein
the noise reduction processing unit includes a coring unit configured to carry out coring processing on an entire screen of the video.

17. The video processing device according to claim 1, wherein
the noise reduction processing unit includes a coring unit configured to carry out coring processing on a block among blocks in the video in which the quantization parameter exceeds the threshold value.

18. A video processing method, comprising:
receiving a video signal obtained by converting video into a signal;
acquiring a quantization parameter for each block in the video;

acquiring a threshold value from a storage device, wherein the threshold value is for determining whether or not a noise larger than a reference value is present in a block in a decoded video obtained by decoding the video;

calculating the noise amount in the video using the quantization parameter and the threshold value; and reducing the noise in accordance with the calculated noise amount, wherein the noise amount in the video is calculated based on the number of the blocks in which value of the quantization parameter exceeds the threshold value, and an amount by which the noise is to be reduced is increased as the noise amount becomes larger.

19. A video processing program that causes the video processing method of claim 18 to be carried out by a computer, and a non-transitory computer readable storage medium that stores the video processing program.

20. A non-transitory computer readable storage having instructions stored thereon, such that when the instructions are read and executed by a processor, the processor is configured to perform the video processing method of claim 18.

\* \* \* \* \*